Figure 1:
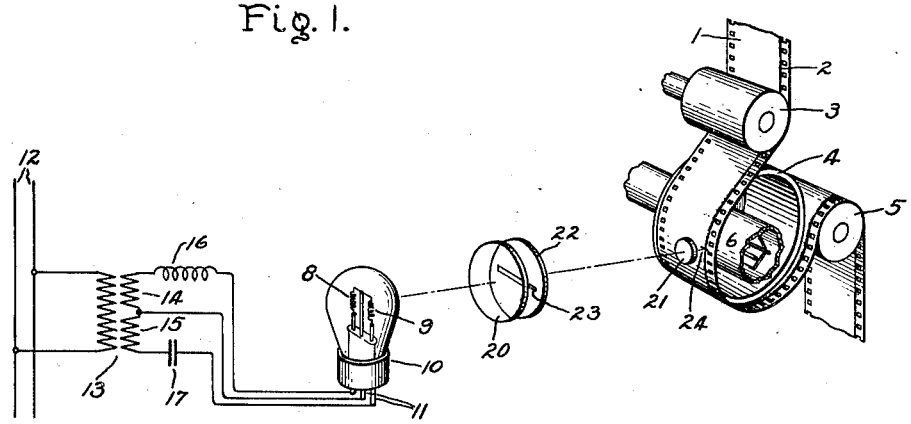

Feb. 9, 1932.                    D. O. WHELAN                    1,844,708
          APPARATUS FOR THE PHOTOGRAPHIC RECORDING AND REPRODUCING OF SOUND
                              Filed Dec. 13, 1929

Inventor.
Dow O. Whelan,
by Charles V. Tullar
His Attorney.

Patented Feb. 9, 1932

1,844,708

UNITED STATES PATENT OFFICE

DOW O. WHELAN, OF SCOTIA, NEW YORK, ASSIGNOR TO GENERAL ELECTRIC COMPANY, A CORPORATION OF NEW YORK

APPARATUS FOR THE PHOTOGRAPHIC RECORDING AND REPRODUCING OF SOUND

Application filed December 13, 1929. Serial No. 413,883.

My invention relates to apparatus for photographically recording sound or for reproducing sound from a photographic record. Apparatus in common use for reproducing sound from film records, for example, in motion picture theatres, employs as a light source a small incandescent lamp which is operated from a storage battery. Light from this lamp is caused to pass in a narrow beam through the sound record on the film where it is modulated by the record and then passed into a photo-electric device. Current from this device after being greatly amplified by thermionic amplifiers is fed into a loud speaker. Because of the fact that it supplies a uniform current, a storage battery has been found well adapted for the supply of energy to the reproducing lamp and in the case of permanent installations such as motion picture theatres no great objection has been raised to the battery because of its weight and the room it occupies. One of the more recent developments of sound reproducing apparatus is that by which the apparatus is adapted for use in the home either with or without accompanying motion pictures, which apparatus should, for convenience, be not only portable but as compact and light as possible. To this end it has been suggested that the storage battery be eliminated and energy for the reproducing lamp be taken from the alternating current house lighting circuit. It has been found however that such a substitution in current source for the lamp has resulted in a line frequency hum from the loud speaker of such a magnitude that it could not be tolerated. The reason is readily apparent. Supposing that the house circuit has the usual 60 cycle frequency, the lamp filament undergoes variations in brilliancy at the rate of 120 per second. These changes while not noticeable to the human eye by reason of the persistence of vision are translated into current impulses by the photo-electric cell of the reproducer, which impulses undergo enormous amplification before reaching the loud speaker. Not only are these current variations objectionable in the case of a reproducer but they are objectionable also in the case of a sound recorder having a lamp which, when there is no sound, should produce a uniform exposure of the film, for it is obvious that any frequency pulsations which are recorded will, when the record is reproduced, appear as an objectionable hum in the loud speaker.

It is the object of my invention therefore to provide improved apparatus of the character mentioned above which employs a light source which is energized by an alternating current and which is partially if not entirely free from frequency variations.

In accordance with my invention I provide the apparatus with a light source which comprises a plurality of filaments, light from which which is combined into a single beam and is projected on the film as such, the filaments being energized respectively by alternating currents of the same frequency but which have a definite phase displacement relative to each other.

My invention will be better understood from the following description taken in connection with the accompanying drawings, and its scope will be pointed out in the appended claims.

Figure 2:
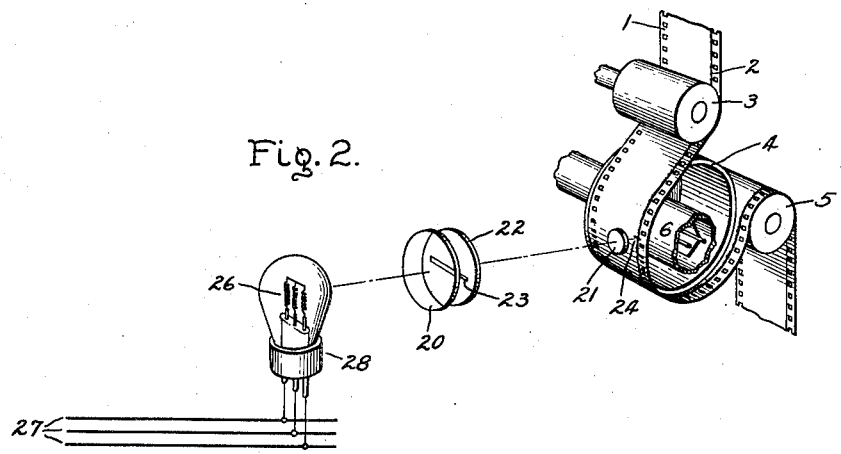
Figure 3:
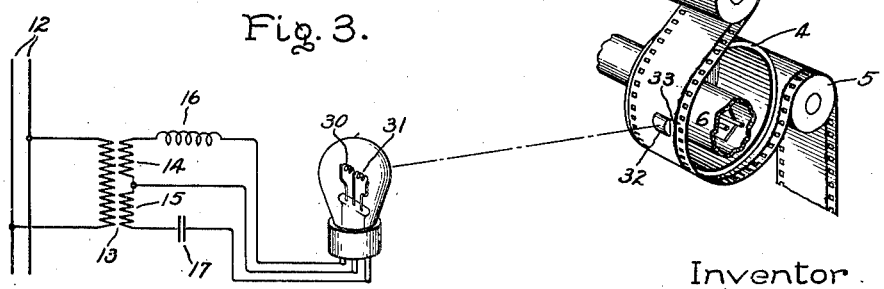

Referring to the drawings, Figs. 1, 2 and 3 are similar diagrammatic views illustrating various forms of my invention as applied to reproducing apparatus.

While my invention is applicable to both recording and reproducing apparatus I have chosen to illustrate it as forming a part of the latter. I have shown by way of example the film 1 having the sound record 2 thereon arranged to pass under the roll 3, over the drum 4 with the edge bearing the sound record overhanging the end of the drum, and over the roll 5. This apparatus it will be understood is merely illustrative of any convenient and suitable means of supporting the film at the point of engagement therewith of the light beam. Arranged behind the sound record portion of the film is the photo-electric cell 6 which as usual is connected through thermionic amplifiers to a loud speaker or other sound translating device, not shown. On the film record are combined and concentrated the light from two sources comprising in the form illustrated by Fig. 1 the two closely coiled filaments 8 and 9. These filaments may if desired be in separate lamps but preferably are enclosed in the same bulb thereby comprising a double filament lamp as shown, for example at 10. The filaments are adapted for separate excitation and have separate terminals 11, except that for convenience the middle terminal is common to both filaments. The two filaments are shown connected to the single phase alternating current source 12 through the step-down transformer 13 having the two secondaries 14 and 15 of which the former supplies current to filament 8 through the inductance 16 and the latter supplies current to the filament 9 through the capacitance 17. The respective values of the inductance and capacitance are so proportioned that the currents in the two filaments 8 and 9 are displaced relative to each other approximately 90 degrees. The means which I have shown for obtaining the desired phase angle between the currents in the two filaments is merely illustrative of various well known means which may be employed for this purpose. Moreover, the transformer may be omitted and the filament circuits connected through the phase displacing means employed directly to the line in the case where the lamp voltage is properly suited to the line voltage. In accordance with the optical system illustrated in Fig. 1, light from the two sources or filaments 8 and 9, which may have any desired arrangement relative to each other, is brought to a focus by the condensing lens 20 producing in the microscope objective 21 images of the filaments 8 and 9. Adjacent lens 20 is the stop 22 having therein the narrow slit or aperture 23 extending transversely of the film. The aperture and the film being at conjugate foci of the objective 21, a reduced image of the aperture is formed on the film which apears as the very narrow bright line of light 24. That portion of the light constituting this bright line which passes on into the photo-electric cell is thereby modulated by the sound record on the film. In as much as the images of both filaments are formed within the boundary of the objective 21 the light from the two filaments is combined or superposed to form the light line 24, it being understood that the filaments and energizing currents are such that equal quantities of light are focused by the two filaments on the film.

In that form of my invention illustrated by Fig. 2 I have shown the same film supporting means and the same optical means as in Fig. 1. In this form of my invention however I employ three light sources or filaments 26 connected respectively to the three phases of the three phase circuit 27. Preferably they are enclosed in the same bulb to form a single lamp 28 as illustrated and may be connected together in delta or star. If the voltage of the lamp is not suited to the line voltage a suitable transformer obviously may be employed between the lamp and the line. Images of the three filaments 26 are formed in the objective 21, hence the light from all three filaments combines to form the light line 24.

That form of my invention illustrated by Fig. 3 is in most respects similar to that shown in Fig. 1. Two light sources or filaments 30 and 31 are employed and are connected to the single phase source 12 in the same manner as in the form illustrated by Fig. 1. The two filaments in this case however are arranged in the same axis which is transverse to the film. The only lens employed is the very small and short focus cylindrical lens 32. Light from the two filaments is combined by the cylindrical lens as with the previously described optical systems to form the narrow, bright light line 33 on the film.

When my invention is applied to apparatus for recording sound on a film it will be understood that some well known means are provided for varying the combined light from the several filaments in accordance with the sound waves. In this connection it hardly needs to be pointed out that should the sound record be made using a single filament energized by an alternating current the 120 cycle frequency hum would be recorded as well as the sound and both would be heard when the record is reproduced.

The several forms of my invention which I have shown and described are merely illustrative and various modifications may be made without departing from the spirit and scope of my invention which modifications I aim to cover by the appended claims.

What I claim as new and desire to secure by Letters Patent of the United States, is:

1. Apparatus for photographically recording sound on a film or for reproducing sound from a film record comprising a plurality of light sources, means for supplying to said sources alternating currents differing in phase, and means for projecting the combined light from said sources onto the film.

2. Apparatus for photographically recording sound on a film or for reproducing sound from a film record comprising a plurality of light sources, means for directing onto said film record the combined light from said sources, a photo-electric cell arranged to receive said light modulated by the record, and means for supplying alternating current to said light sources, the currents in the respective sources having a phase displacement relative to each other.

3. Apparatus for photographically recording sound on a film or for reproducing sound from a film record comprising a plurality of light sources, means for directing onto said film record the combined light from said sources, a photo-electric cell arranged to receive said light modulated by the record, and means for supplying alternating currents of differing phase to the respective sources for energizing the same.

4. Apparatus for photographically recording sound on a film or for reproducing sound from a film record including multiphase alternating current lighting means comprising a plurality of filaments each adapted to be energized by a separate phase, means for projecting the combined light from said sources on the film record, and photo-electric means arranged to receive said combined light as modulated by the sound record.

5. Apparatus for photographically recording sound on a film or for reproducing sound from a film record comprising an alternating current lamp having a plurality of filaments, means for supplying to the respective filaments currents having a predetermined relative displacement, means for focusing the combined light from said filaments in a narrow band on the film and a photo-electric cell arranged behind the film to receive said combined light as modulated by the record.

In witness whereof I have hereunto set my hand this 12th day of December, 1929.

DOW O. WHELAN.